Patented Feb. 2, 1926.

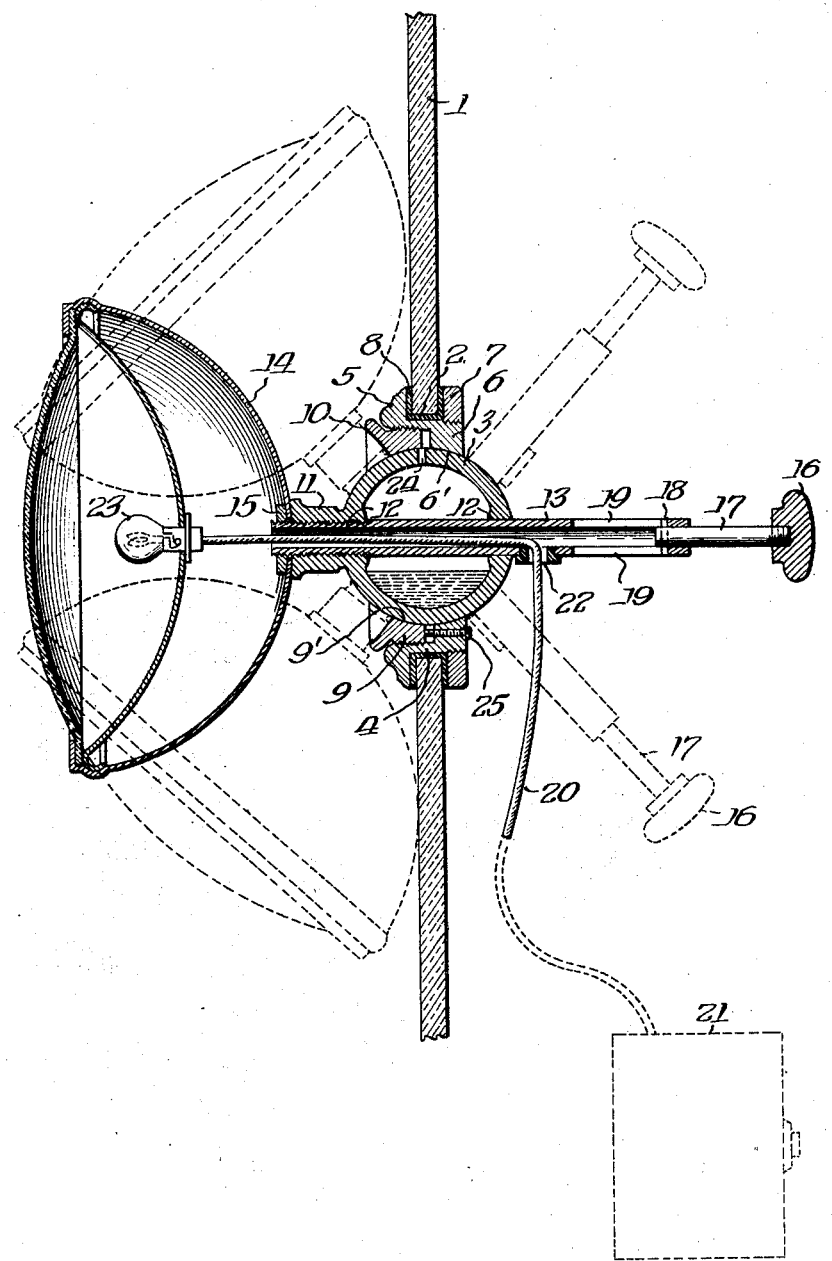

1,571,709

UNITED STATES PATENT OFFICE.

OLIVER H. CLARKE, OF WASHINGTON, DISTRICT OF COLUMBIA, ASSIGNOR TO THE CLYMER MANUFACTURING COMPANY, OF ROCKFORD, ILLINOIS, A CORPORATION OF COLORADO.

SPOT OR SEARCH LIGHT ASSEMBLY.

Original application filed March 17, 1920, Serial No. 366,683. Divided and this application filed July 14, 1924. Serial No. 725,843.

*To all whom it may concern:*

Be it known that I, OLIVER H. CLARKE, a citizen of the United States, residing at Washington, in the District of Columbia, have invented certain new and useful Improvements in Spot or Search Light Assemblies, of which the following is a specification.

This invention relates to illuminating devices for automobiles by means of which the driver of the car is enabled, without distraction from his duties as driver, to direct a projected beam of light in any desired direction forwardly or laterally of the automobile for the purpose of illuminating the road, the terrain at either side thereof, or signs or house numbers, the observation of which may be desirable. More specifically, the invention relates to that class of spot or search lights which are mounted in the windshield of the automobile and are equipped with a handle which may be manipulated from within the car.

My present invention constitutes a division of an application heretofore filed by me on the 17th day of March, 1920, Serial No. 366,683, which application has since matured into Letters Patent 1,501,704, dated July 15, 1924. The practical utility of lights of this character is enhanced by making them readily removable from outside the car for use as a so-called "trouble light"; and one object of my present invention is to provide an improved mounting for the spot light in the windshield by which the light can be readily withdrawn from the front for use as a trouble light, when desired or required, without the necessity of detaching the entire mounting from the windshield, or disturbing the parts of the mounting which are fitted in the hole in the windshield and clampingly engage the latter.

One drawback to removable spot lights, however, is that they are easily stolen, especially when removable from the outside of the car. Another object of the present invention is to provide a means for mounting a spot light removably in a windshield, which shall include means by which the spot light is locked from the inside of the car against theft or any unauthorized removal from the outside.

Other objects and attendant advantages of the invention will be apparent to persons skilled in the art as the same becomes better understood by reference to the following detailed description, taken in connection with the accompanying drawing wherein I have illustrated a practical embodiment of the principle of the invention, and in which—

The figure is a transverse vertical section of the spot light and fragment of the windshield taken through the axis of the light and its stem or shank, several positions of the light being shown in dotted outlines.

Referring to the drawing, 1 designates the glass windshield formed with a round hole 2 therein. 3 designates a spherical lamp supporting element or member which is supported in the windshield 1 by my improved mounting. Describing this mounting, 4 designates a ring of substantially Z shape in cross-section, being formed on one side with an outwardly directed radial flange 5 and on the other side with an inwardly directed radial flange 6, the inner periphery of which is concaved transversely to fit the surface of the sphere 3 and form a part seat or bearing 6' for the latter. The outer periphery of the flange 6 is threaded to receive an auxiliary ring or clamping flange 7 by means of which and the flange 5 the ring is securely clamped to the margin of the hole 2 of the windshield. A channel shaped washer 8 of yielding material is fitted into the annular channel formed by the ring 4 and its flanges 5 and 7 so as to provide a yielding grip of the mounting on the windshield to avoid rattling and danger of fracturing the glass.

The inner periphery of the ring 4 and its integral flange 5 is threaded to receive an externally threaded retaining ring 9, the inner periphery of which is transversely concaved to fit the sphere 3 and form with the corresponding interior periphery of the flange 6 a complemental seat or bearing 9' for the sphere. To facilitate the application and removal of the ring 9 it is provided on its outer side with a gripping flange 10.

The ball or sphere 3 is preferably formed with an integral boss 11 on its outer side, and a diametrical bore 12 extends through the sphere and the boss 11, coaxial with the latter, the portion thereof extending through the boss being threaded to engage with a tubular shank or stem 13, the forward end of which is passed through a hole in the lamp casing 14 and receives a nut 15 by which the lamp casing 14 is securely clamped against the outer face of the boss 11, which face is preferably made concave to fit the convex outer surface of the lamp casing. The other or inner end of the tube 13 is provided with a longitudinally movable knob 16 mounted on a stem 17 that is slidable in the tube 13 and equipped with a cross-pin 18 slidable in opposed slots 19 of the tube 13 to prevent turning of the knob 16 and its stem 17 relatively to the lamp stem or shank 13. Battery wires 20 are conducted from a battery (not shown) around a reel indicated by dotted lines at 21, through an opening 22 in the hollow stem 13, and thence through the latter to the electric bulb 23 within the lamp casing.

The spherical bearing member 3 may also be utilized as an oil reservoir by the provision of an opening 24 through which the oil may be introduced, and when it is desired to film the contacting surfaces of the ball 3 and its bearings 6' and 9' with oil it is necessary only to invert the ball sidewise, bringing the opening 24 to the bottom or below the level of the oil.

From the foregoing it will be apparent that by simply backing out the retaining and bearing ring 9, the lamp with its supporting member 3 and its stem and handle can be withdrawn bodily from the front for use as a trouble light, and replaced by simply re-entering the shank and supporting member and securing the retaining and bearing ring 9 back into place; and this can be done without the necessity of detaching or removing the mounting 4 from the windshield or disturbing the instrumentalities by which it is clamped and cushioned on the windshield.

However, this facile removability of the lamp invites to theft; and with a view to blocking the latter I have provided a simple means by which the retaining and bearing ring 9 can be locked from the inside of the car against removal. The means herein shown for this purpose consists of a thrust screw 25 threaded through the inner bearing member 6 and abutting against the inner face of the retaining and complemental bearing member 9. The thrust of this screw locks the co-operating threads of the ring 4 and bearing member 9 against turning except under the application of considerable force. Hence, when the owner or operator of the car wishes to remove the spot light he first loosens the thrust screw 25 so that the retaining and bearing ring 9 can be readily unscrewed; and when the light is replaced and again secured in operative position by the ring 9, the screw 25 is again tightened up. This provision of means operable from inside the car for locking the lamp against removal from the outside is of great practical importance especially in the direction of preventing theft. It is also of value as a means for preventing the accidental loosening or backing out of the ring 9 which would cause the bearing to become loose and to wobble or rattle in its seat and permit the forwardly projecting lamp to drop to its lowermost position. While I have herein shown but one very simple locking means, it is to be understood that other means for the same purpose and securing the same result may be employed without departing from this broad feature of the invention.

I claim—

1. In combination, a windshield having an opening therein, a spot light having a shank extending through said opening, and means for mounting said shank in said opening with capacity of angular movement, said mounting means including windshield gripping means and a removable element permitting withdrawal of the spot light shank through said opening without removing the rest of said mounting means from the windshield.

2. In combination, a windshield having an opening therein, a spot light having a shank carrying an angularly movable bearing member lying in said opening, and a two-part seat for said angularly movable member, one of said parts being secured in said opening to the windshield, and the other being removable to permit withdrawal of the spot light shank through said opening.

3. In combination, a windshield having an opening therein, a spot light having a shank carrying a spherical bearing member intersecting said opening, and a two-part seat for said spherical member, one of said parts being secured to the windshield in said opening, and the other being removable from the front of the windshield to permit withdrawal of the spot light shank through said opening.

4. In combination, a windshield having an opening therein, a spot light having a shank carrying a spherical bearing member intersecting said opening, and a two-part seat for said spherical member, one of said parts extending through said opening and provided with radial flanges gripping the outer and inner surfaces of the windshield around said opening, and the other being removable to permit withdrawal of the spot light shank through said opening.

5. In combination, a windshield having an opening therein, a spot light having a shank extending through said opening, an internally threaded ring fitting said opening and provided with radial flanges gripping the outer and inner surfaces of the windshield around said opening and with an inwardly directed flange forming a bearing for said shank, and a threaded retaining-ring engaged with the internal thread of said first-named ring and forming a complemental bearing for said shank.

6. In combination, a windshield having an opening therein, a spot light having a shank carrying a spherical bearing member intersecting said opening, a ring fitting said opening and formed on one side with an outwardly directed flange engaged with the windshield and on its opposite side with an inwardly directed flange formed with a seat for said spherical bearing member, a windshield clamping ring screwed onto said first-named ring opposite to said outwardly directed flange, and a retaining ring screwed into said first-named ring and formed with a complemental seat for said spherical bearing member.

7. The combination with a windshield having an opening therein, of a spot light mounting having a portion secured in said opening, and a second portion secured to the first portion and removable forwardly therefrom, a spot light supported in said mounting with capacity of angular movement and removable from said mounting forwardly of the windshield, and means on the rear side of the windshield for locking said spot light against removal from said mounting.

8. The combination with a windshield having an opening therein, of a spot light having a shank extending through said opening, a mounting for said shank secured in said opening, said mounting including a removable element whereby the shank of said spot light is retained in and may be withdrawn in a forward direction only from said mounting, and means for locking said removable element against removal.

9. The combination with a windshield having an opening therein, of a spot light having a shank extending through said opening, a mounting for said shank secured in said opening, said mounting including an element removable from the front side of the windshield whereby the shank of said spot light is retained in and may be removed from said mounting, and means operable from the rear side of said windshield for locking said removable element against removal.

10. The combination with a windshield having an opening therein, of a spot light having a shank carrying a spherical bearing member intersecting said opening, a mounting ring fitting in said opening and provided with flanges gripping the windshield around said opening and with a seat for said spherical bearing member, a retaining ring screwing into said mounting ring and formed with a complemental seat for said spherical bearing member, and means for locking said retaining ring against unscrewing movement.

11. The combination with a windshield having an opening therein, of a spot light having a shank carrying a spherical bearing member intersecting said opening, a mounting ring fitting in said opening and provided with flanges gripping the windshield around said opening and with an inwardly directed flange forming a seat for said spherical bearing member, a retaining ring screwed into said mounting ring and formed with a complemental seat for said spherical bearing member, and a thrust screw mounted in said inwardly directed flange and abutting against the inner side of said retaining ring to lock the latter against unscrewing movement.

OLIVER H. CLARKE.